IMAGE REPRODUCTION

Filed Dec. 2, 1964 2 Sheets-Sheet 1

INVENTORS
GEORGE R. MOTT
DAVID H. PERRY
BY Anthony D. Cennamo
ATTORNEYS

Oct. 29, 1968 G. R. MOTT ETAL 3,408,216

IMAGE REPRODUCTION

Filed Dec. 2, 1964 2 Sheets-Sheet 2

INVENTORS
GEORGE R. MOTT
DAVID H. PERRY
BY Anthony D. Cennamo
ATTORNEYS

United States Patent Office 3,408,216

Patented Oct. 29, 1968

3,408,216

IMAGE REPRODUCTION

George R. Mott, Rochester, and David H. Perry, Webster, N.Y., assignors to Xerox Corporation, Rochester, N.Y., a corporation of New York Filed Dec. 2, 1964, Ser. No. 415,383
16 Claims. (Cl. 117—.5)

ABSTRACT OF THE DISCLOSURE

A method of reproducing images wherein an original document, capable of depositing a condensate reproduction of an original image, is positioned adjacent a support material to transfer the condensate image to the support material as by vaporization or pressure transfer. The support material bearing the condensate image of the original document is superimposed upon a donor film bearing transfer material which is adhesive to the support material in non-condensate image areas. The superposed materials are subsequently separated to produce complementary positive and negative reproductions of the original document.

This invention relates to novel method and apparatus of image reproduction. More specifically, the invention relates to the reproduction of images capable of emitting, discharging, or otherwise susceptible to depositing a condensate or other liquid in image configuration onto a receptor surface.

With an ever increasing yield of information of various forms, there has arisen concomitant need for improvements in recording and reproducing the information. Thus, many purposes exist for which it may be desired that original information be reproduced, as for example, to effect wide dissemination, to effect permanent records or otherwise passing information, for storage purpose, and the like. In other instances, it is desired to transpose information into a more useful form for which it is to be utilized. Thus, it may be desirable to convert opaque information into an image projection transparency or the like. Hence, it has long been desired that a reproduction system be available that would accord flexibility in the ultimate reproduction form and, at the same time, offer versatility of controlled fidelity and characterized by wide latitudes of sensitivity.

Now in accordance with the instant invention, there has been discovered a novel image forming process in which an original image capable of emitting, discharging or depositing a condensate in image configuration forms a basis by which the image can be reproduced. The reproduction can comprise an image transparency in either negative or positive form or both or an opaque reproduction in likewise either positive or negative form or both. At the same time, it has been found that the instant process admirably lends itself to effect fingerprinting reproduction in likewise either positive or negative form or both. This latter technique is accomplished in a much more rapid, effective and resolute manner and without the attendant ink smearing of the fingers as has been conventional with law enforcement agencies for many years. By the process hereof, a condensate image of an original formed on a transfer base constitutes a resist against selective adhesive transfer of an opaque releasable donor film to the remaining areas of the base.

It is therefore an object of the invention to provide novel method and apparatus for the recording and reproduction of information.

It is a further object of this invention to provide novel method and apparatus for the formation of either negative and/or positive image reproductions.

It is a further object of the invention to provide novel method and apparatus for the simultaneous formation of complementary negative and positive image reproductions.

It is a still further object of the invention to provide novel method and apparatus for forming high density, high contrast reproductions from relatively low density, low contrast original images.

It is a still further object of the invention to provide novel method and apparatus for rapid transformation of original information into a high resolution reproduction expediently and relatively inexpensively as compared to known methods of the prior art.

It is a still further object of the invention to provide novel method and apparatus for the recording of human fingerprints without the need to pre-ink the fingers as has been done for many years in the prior art.

Additional objects of this invention will in part become obvious and will in part become apparent from the following specification and drawings, in which:

FIGS. 1, 2 and 3 schematically illustrate forming a condensate image of an original onto a receptor surface;

Figure 6A:
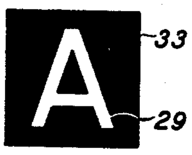
Figure 7A:
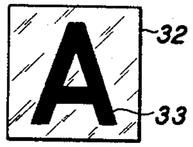
Figure 5:
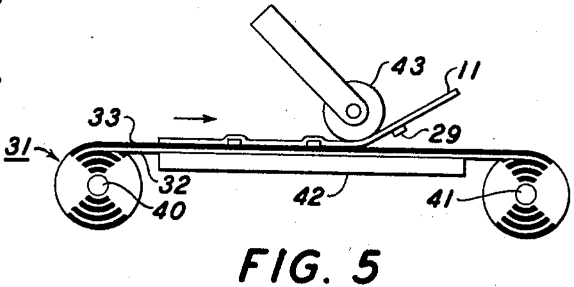
FIG. 5 illustrates the application of a receptor sheet bearing a condensate image against a support base having a releasable donor film.
Figure 6B:
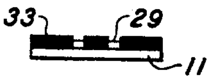
Figure 7B:
Figure 8:
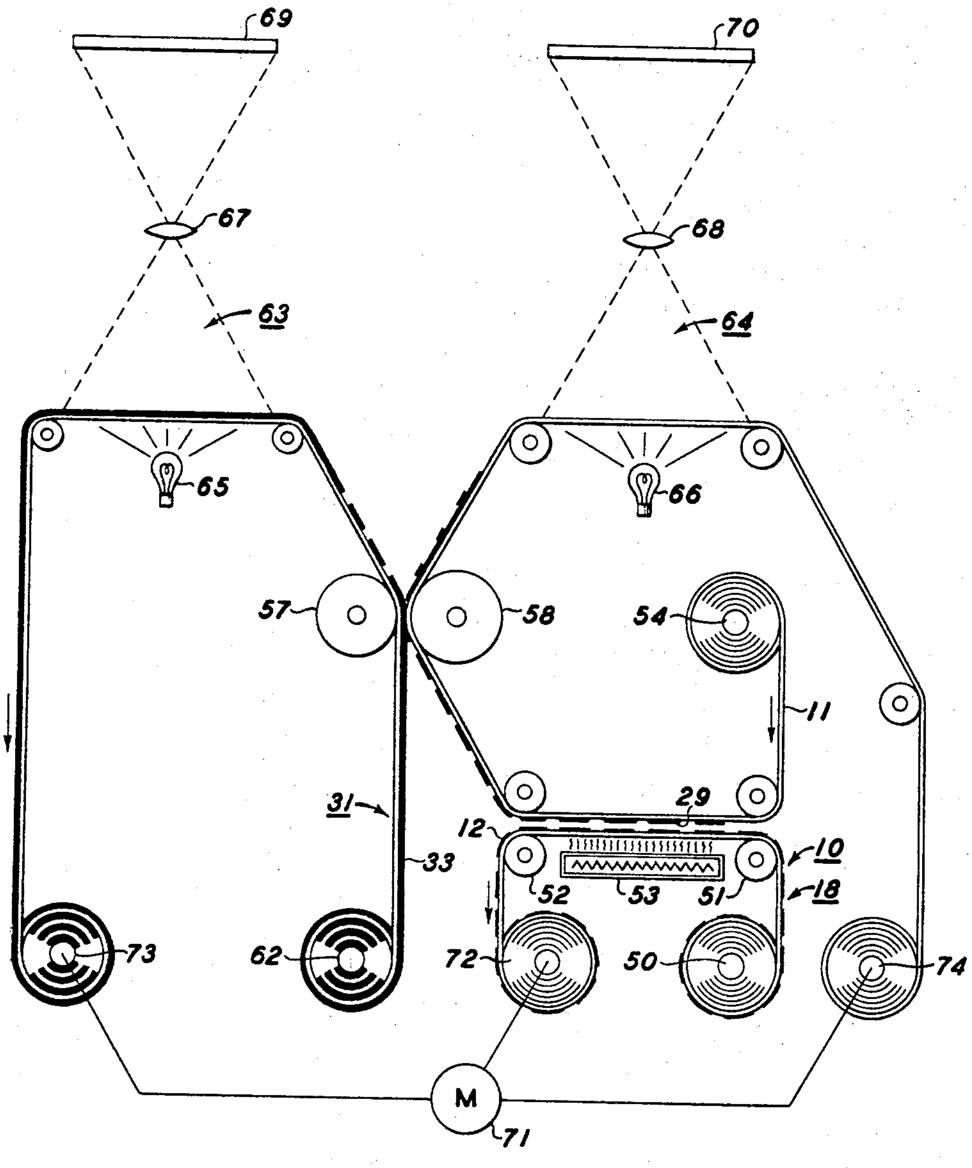

FIGS. 6*a* and 6*b* illustrate the resulting product in section and plan respectively on the receptor sheet after being stripped apart from the support base in the relation formed in FIG. 5;

FIGS. 7*a* and 7*b* illustrate the support base in section and plan respectively after being stripped apart from the relation formed in FIG. 5, and FIG. 8 schematically represents a continuously operable apparatus for forming image projection transparencies in accordance with the method of the invention.

Figure 1:
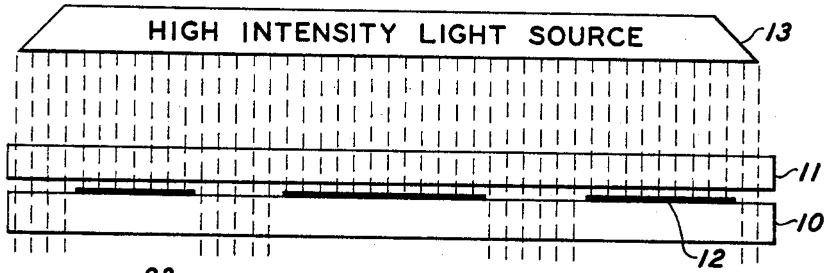

Reference is now had to FIG. 1 wherein a first embodiment is illustrated in order to form a condensate pattern onto a receptor base 11 corresponding to the image to be reproduced. Imagining member 10 contains printed image areas 12, such as newspaper print or the like, in which the images have been formed by printing inks containing volatile oils, tars, water, alcohol or any one of various oils or oily materials. Receptor base member 11 comprises any suitable transparent or translucent material such as glass, plastic or the like, as will be described and understood, and may also include such materials having an adhesive tacky surface to which the volatile material of the image is to be transferred. Member 11 is otherwise characterized as having a surface generally non-absorbent to volatile materials or vapors of the image.

To effect transfer of the volatile components of the image material receptor base 11, where not adhesive, is placed into face-to-face contact with the image original. Where adhesive the base sheet is supported spaced closely thereto in the manner shown in the drawing so as not to become attached to the original. With the base and original thus supported, a high intensity heat from a source 13 comprising a high energy source such as a high power electronic photoflash lamp, infrared lamp, or heat lamp unit such as are used in thermographic copying machines, is directed to impinge on the image surface of the original. Where receptor base 11 is non-adhesive, it together with the original can be passed through a conventional type thermographic copying machine, as marketed for example, by Minnesota Mining and Manufacturing Company, St. Paul, Minnesota under the trade name "Thermofax." The heat energy required is usually in the range of between about 25–150 watt seconds per square inch depending on the volatility of the materials and it is preferable that the source provide energy primarily in the spectrum that will be absorbed by the image colors of the original.

As a result of exposure to the intense heat, it has been found that the volatile materials, in or on the surface of image segments 12 are volatilized to condense on corresponding adjacent surface areas of receptor base 11 and can be utilized as will be further described. A highly volatile image material requires less heat energy, but has shorter persistence as a condensate image. With a volatile material such as a petroleum machine lubricating oil of the type used for sewing machine oil, a suitable energy is about 70 watt seconds per square inch. Where the original is on a transparent support, receptor base 11 can be opaque and heat radiated from the free side of the original.

Figures 2, 3, 4:
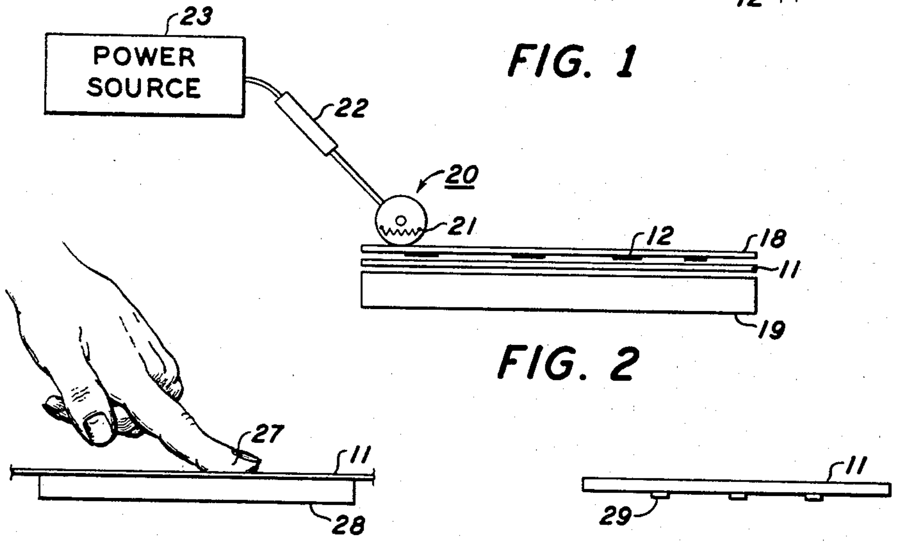
FIG. 4 is a cross-section through a receptor sheet containing a condensate image.

Referring now to FIG. 2, there is illustrated a second embodiment for transferring volatile portions from image areas 12 contained on an original image sheet 18. In this embodiment, image 12 is formed by typing, transferring, or inking with an inking material in combination with a heat volatilizable chemical component. The component may be any one of a number of chemicals including, pyrocatechol; aniline; dithioxamide; N-dimethyl-dithiooxamide; N,N'-bis(2-hydroethyl) dithiooxamide; N.N'-bis(carboxy-methyl) dithiooxamide; other dithiooxamide derivatives; hydrazine; pyrogallol; N-(p-hydroxphenyl) glycine; hydroxylamine; diaminophenol hydrochloride; p-methylaminophenol sulfate; dichlorohydroquinone; thiourea; chlorohydroquinone; bromohydroquinone; gallic acid; ammonia salts; ammonium benzoate, ammonium acetate or ammonium carbonate in which the chemical comprises about 10–50% by weight of the ink and chemical mixture. For example, a silk typewriter ribbon dipped in a mixture of 20 grams of rubeanic acid to 100 grams of black typewriter ink will produce a typewritten copy usable in accordance with process hereof.

To form the condensate image, a copy sheet 18 containing inked images 12 formed as above is first placed contiguously superposed over the receptor base 11 positioned on a heat absorbent pad 19, such as aluminum. With this arrangement, the backside of the original is then heated by means of a heat applicator 20 advanced across the surface in the direction shown and containing a thermal element 21 connected through handle 22 to a power source 23. In heating the image original by this or other suitable means, the heat intensity and the exposure time duration is such as to cause a portion of the ink chemical of the image characters to sublime or otherwise become vaporized. Suitable heat may be applied by operating the applicator at a temperature of about 200–400° F. and advancing it at a speed of about ½–4" per second. With the roller at 240°, a speed of about 1" per second has been used when the chemical agent of the image comprises rubeanic acid. While still higher temperatures produce good results at increased speeds, they increase the likelihood of heat damage to the material or equipment. Where receptor base 11 includes an adhesive surface facing the original the latter must be maintained uniformly spaced from the former and heating means other than a roller is employed in order to permit subsequent separation of the materials without adhesive bonding. Since transfer is effected between surfaces in virtual or actual contact, no perceptible or significant loss of resolution results. Likewise, in view of the minute quantities of material transferred, bleeding effects are practically nonexistent. Whatever heating method is employed, it is only essential for the purposes hereof that a portion of the chemical reagent is transferred from the image by vaporization and condensation from the original to the transfer sheet, such that the latter, bearing the volatilized image deposited or retained on its surface, can be processed subsequently as will be described below.

Referring now to FIG. 3, there is illustrated a manner in which the condensate image is formed from an original having an oily or liquid texture without the necessity of heat generation and volatilization as from a human fingerprint. Specifically, for producing fingerprints by this method a clean, human finger 27 of a registrant is rolled in contact against the receptor base 11 supported on a platen 28. For these purposes, transfer base 11 is preferably adhesively tacky in order to ensure sufficient retention of the surface oils and may comprise any of commercially marketed adhesive tapes including transparent tapes. As the finger is rolled over the base, the oils contained on the raised portions outlining the fingerprint adhere to the base to comprise a condensate image which as before can subsequently be employed as a resist to effect its reproduction. Where desired, the fingers may be initially coated with a suitable oily or wettable substance. After rolling the fingers the registrant, whose fingerprints are to be recorded, is freed of any further acts in carrying out the process including the elimination of a subsequent washing step with highly concentrated detergents as has been the practice for removal of ink by existing techniques.

By whatever embodiment the condensate image is deposited as exemplified by FIGS. 1–3, there is produced the article illustrated in FIG. 4 comprising a transparent, translucent, or opaque receptor base 11 containing the volatilized material 29 deposited thereon in image configuration. It will also become apparent that in some instances the condensate image can be deposited onto the surface of a donor film as will be described.

Next subsequent, the article thus produced is placed as illustrated in FIG. 5 against a web support base designated 31 formed of a support backing 32, which may be opaque, translucent or transparent as will be understood, and on which is supported a releasable donor layer or film 33 as will be described. The web support may conveniently be stored on a supply roll 40 and drawn onto a take-up roll 41 between which is a support platen 42. The receptor base 11, bearing the volatile image 29, is then pressed firmly against the donor film 33 on base 32 as by a roller 43. In this relation, there should exist a tacky or adhesive bond formed between the adjacent superimposed members which may be brought about by employing a material as member 11 which is naturally tacky or a material which is rendered tacky without affecting the donor film. Likewise if member 11 is non-tacky, a tacky coating can be applied to the donor film prior to pressing member 11 thereagainst. To be operable, the images 29 create adhesive (non-adhesive) areas in the form of a resist so that substantially an adhesive contact is formed only between the non-image supporting areas of member 11 and the donor film. After the two webs attain an adhesive grip, they are stripped apart to produce the two separate complementary articles illustrated in FIGS. 6 and 7.

As may be seen in FIGS. 6 and 7, there is shown for comparative purposes a letter A formed in complementary fashion. Thus, the surface of base 11 is now completely covered by the combination of condensate image 29 in image configuration and donor film 33 in the remaining areas. With the proper choice of materials the condensate image areas can subsequently be wiped, or evaporated such that only opaque donor film 33 remains on receptor base 11 outlining the image. Where base 11 is transparent, the article of FIG. 6 constitutes a negative image projection transparency with the image areas represented by the letter A being substantially clear and light transmitting. The light transmitting properties of the image can be enhanced to become increasingly transparent where required, i.e., the light scattering properties of the image can be reduced as by coating these areas with a material having a similar index of refraction, such as with a liquid encapsulating tape, or by such other means known in the art.

Illustrated in FIG. 7, on the other hand, is the complementary article from that formed in FIG. 6. Likewise, with a proper choice of materials, including transparent base 32 and an opaque donor film 33, the article of FIG. 7 comprises a positive image transparency of the same letter A. This includes the remaining unremoved donor film 33 supported on a support base 32, because of the resist effect of the condensate image. As just described therefore, there is simultaneously formed in accordance with this invention a complementary positive and negative image either or both of which may be opaque or transparent depending upon the optical properties of the base materials employed.

Referring now to FIG. 8, there is schematically illustrated automatic apparatus in accordance with the invention hereof. As there shown, a source of original image material 10 or 18 as described above is suitably advanced as from a supply roll 50 over guide rolls 51 and 52 at a uniform rate. In advancing between the guide rolls, the imaging member passes above a high intensity heat or light source 53 effective for volatizing condensate from the image areas. Simultaneous therewith, a supply of receptor base 11 furnished from a supply roll 54, is advanced contiguously superposed to the imaging material to receive a deposit of the emitted volatized portions therefrom. The receptor base 11 now bearing the volatized image is advanced betwen a pair of pressure rolls 57 and 58 in intimate pressure adhesive engagement with a synchronously moving web of transfer base 31 being supplied from a supply roll 62.

Upon separation after passing through the bite of the pressure rolls, complementary images are formed on the respective web members in the manner described in FIGS. 6 and 7 and each of the respective webs continue their movement until passing through respective exposure stations 63 and 64. At the exposure stations, light sources 65 and 66 illuminate the image formations which are projected via lenses 67 and 68 onto their respective screens 69 and 70. In order to assure synchronous movement between the various members, either or all may be driven via motor 71 operatively connected to take-up rolls 72, 73 and 74. Suitable clutching arrangements can be employed to ensure that the linear rate of web movements remain substantially constant as the diameter of the individual take-up rolls are increased. Where either of members 11 or 31 have an opaque base, reflex projection can be employed or optionally projection may be dispensed with. Also, following projection, the web member may be directed to storage or the like for permanent recording purposes.

Speeds at which the mechanism is operative depend on various factors, such as material property limitations, desired resolution, etc. Operational speeds on the order of 10–20 inches per second are completely compatible with the invention such that the image information is transformed and made available for utilization within about 1½ to 4 seconds.

Obviously, many materials having various orders of suitability are commercially available or can be adapted for the role of receptor base 11. For transparency formation, polyester film Mylar backed tapes have exhibited greater strength and greater dimensional stability than either acetate or cellophane although all are usable in successfully carrying out the invention. Available commercial forms of masking tapes are suitable for low resolution reproduction not requiring transparency. Desirably, a tape should have an adhesive layer capable of retaining the condensate formation without flowing through or round the formation, if an adhesive web is being employed so that the image areas will prevent stripping of the donor film or layer. At the same time, if an adhesive web is employed, adhesion must be adequate for substantially complete removal or stripping of the donor film from the donor web 31 during this manipulation.

Suitable materials for base 11 include cellophane tapes, masking tapes, household adhesive tapes, including friction tapes, plastics coated with a tacky layer such as rubber cement, and the like. As has been stated previously, where a receptor base is inherently non-tacky, a suitable cement can be applied either to its surface or to the surface of the donor film 33 for effecting subsequent transfer. In the latter situation, the volatile image may remain bonded to those portions of the donor film with which it contacts and may require subsequent removal as by washing, wiping or evaporation as necessary.

As a general matter, the main control on the resolution of images formed is the resist comprising the condensate image 29. Generally, no perceptible loss of resolution results because of the additional steps of this invention. However, it should be appreciated, as a lens can affect quality in the projection of an image, it is believed that the other steps of this invention may slightly deteriorate quality in the image produced. Whether or not this is so, ultimate quality is defined by the quality of the resist condensate image itself. As should be apparent for high resolution, the volatized substance from the original should correspond closely to the original in all its reproductive features.

To assure maintenance of resolution employing adhesive type transfer techniques, a "hard" adhesive should be employed with a "low-quick tack." Such a material is a pressure sensitive adhesive with a high creep resistance and about a three-pound peel strength per inch of width as measured when being removed from polished stainless steel at 72° F. employing a 180° peel angle at the rate of about 4 feet per minute. This class of adhesiveness is not intended herein as a definition of operability limits or as defining criticality, but is included for purposes of providing complete disclosure. Operability in a practical sense is a function of the image resolution desired and resolution as is now apparent will depend on many factors.

The donor film 33 and its support base 32 likewise play an important role in the instant process and these should include appropriate properties compatible with the other materials being used. The film produces better quality images if uniform. This is more readily accomplished if the base presents a smooth surface for the film. In addition, if high image resolution is of interest, support layer 32 should preferably be a relatively thin flexible section on the order of about .001 inch or less. Flexibility in support 32 allows the donor film to flow about the image and thinness in this layer also is of value in making the contact complete. For images having relatively low resolution, films of ⅛" thickness have been used. It should, of course, be appreciated that support 32 need not be a thin layer and may comprise a solid member such as wood, plastic elements, metals or the like. If support 32 is not transparent, as when a thick metal member is employed, the image produced should optically contrast with the surface for reading purposes.

The internal body of the donor film 33 should be great enough to permit complete stripping of the film from the base. Additionally, the base material should offer a bond to the donor film of a force greater than the transverse internal bond or strength of the film. Preferably, the base should be of an expendable material, although reusable materials such as various forms of glass and metals are not excluded and are of value for particular applications. Polyester films have been found to work well as the base, due to their general utility, dimensional stability and high strength. They are also of value because of their transparent qualities.

The opaque donor film or layer 33 contained on base 32 should be adequately and uniformly opaque throughout and at the same time, desirably ought to be uniformly releasable to the adhesive bond formed by the adhesive employed. Evaporated metal coatings of antimony, aluminum and silver have exhibited properties suitable for the purpose hereof a swell as particulate dispersions.

In the usual form of the invention as carried out, it was found that opaque particulate dispersions, dispersed in a thin, uniform film coated onto the base performed very effectively. Electrophoretic deposition gave controlled uniform thicknesses with good adhesive retention. Ordinarily, dispersing agents such as tannin, or sulfonated oils, as low as 0.1% by weight, are useful to maintain the particles in suspension and to provide adequate bond between particles. The binder need only be sufficient to cement the material and not to provide continuity. Bonding may also be enchanced by incorporating from about 0.5% to about 20% by weight of a plastic material such as acrylics, polystyrenes, methylates, etc. Graphite and carbon blacks are ideal pigments due to their fine particle size and opacity, but most other pigments will operate. Various dag suspensions of the Acheson Colloids Company have worked well. Metal powders and pigments such as iron oxide and zinc chromate have likewise worked well. Where the donor film is of a conductive material, it can be utilized as a printed circuit or circuit board as is well known in the art.

Thickness of the donor film is not considered critical and is largely a function of resolution to be attained. Generally thickness ranges from about .0001 inch to produce about 70 lines pairs/mm. and above and to about .003 inch and over for 40–50 line pairs/mm. However, operable films have been prepared ranging down to 1,000 angstroms employing evaporated metal coatings and up to .001 inch thickness for particulate film from which fine results have been obtained. Thicker films on the order of 1/16 inch have been employed for applications in which high resolution is not a primary consideration as in the preparation of Braille images and, of course, still thicker films or layers may be used.

In accordance with the invention, the condensate image formed on the transfer member need not be legible, it being sufficient that it afford resistance to donor transfer. By this means, a thin slight uniform deposition of the condensate material can be utilized to produce a high contrast reproduction such as a transparency. In effect, the process of the invention achieves a quantum gain in photographic speed or sensitivity over conventional line copy reproduction by its ability to convert the low density, low contrast, image emitting, minute quantities of condensate to one of high density and high contrast. Gains of 4 to 1 are general and gains of 10 to 1 can be achieved.

In a preferred embodiment, a condensate image from a newspaper sheet was formed on adhesive tape, of a type commercially marketed by the Minnesota Mining and Manufacturing Company, as brand 853 Mylar tape. The donor film had been formed on a ½ mil Mylar base by dip-coating thereon a colloidal suspension of graphite in a solvent with a dispersing or binding agent of a type marketed commercially as dispersion No. 154, by the Acheson Colloids Company. The tape bearing the condensat resist was then rolled against the donor film. The tape was then stripped, producing a negative image transparency on the adhesive tape and a positive image transparency on the donor base, each having image resolutions on the order of 120 lines pairs/mm.

Using the same materials, fingerprints were processed similarly after first rolling the finger in firm contact with the adhesive surface of the tape. Resolutions were obtained equal and greater than those obtained by prior techniques.

By the above description, there have been described a novel method of image reproduction capable of wide latitudes of sensitivity, fidelity as well as utility. By virtue of the quantum gain benefits, images of low density can be transformed into high density reproductions. This is exemplified by the specific advantage hereof when used for reproducing fingerprints or the like. Normally, the contrast existing on the print area of a finger is so slight as to be hardly perceptible except upon close examination. The process hereof however, is effective for producing a high contrast sharp reproduction of the fingerprint in either positive or negative form from which many subsequent reproductions can be made by the same or other conventional processes. By a proper choice of materials, extremely high resolution images can be obtained. In addition, donor films such as the particulate dispersion described above are characterized by clean, sharp breaks giving sharp edges and corners. The abrupt transition, as compared to prior art techniques in which the transition has associated bleeding between colors, results in extremely high definition. With this control over resolution as well as high definition, it has been found possible to produce high quality half tone reproductions. In addition, since very high resolution is possible, continuous tone renditions are producible. In effect, following the teachings of the instant invention and employing high resolution half tone processes, grain size approaches for example, that found in high quality photographic systems to result in high quality continuous tone renditions. In addition, the process lends itself not only to forming black and white image transparencies, but also to multicolor transparencies.

The invention is not intended to be limited to any named materials since any suitable material combination according to the results described above are intended to be encompassed herein. Whereas high resolution reproduction has been distinctly emphasized as an advantage of the instant invention, it should be apparent that the scope of the invention is much broader and diverse.

Since many changes can be made in the above construction and many apparently widely different embodiments of this invention could be made without departing from the scope thereof, it is intended that all matter contained in the drawings and specification shall be interpreted as illustrative and not in a limiting sense.

What is claimed is:

1. The process of forming image reproductions comprising the steps of:
- depositing a fluid image from an original document onto a support material,
- superposing said fluid-image-bearing support material onto a transfer sheet bearing an overlay,
- said overlay being adhesive to said support material in non-fluid-image area,
- said fluid image being abhesive to said overlay on said transfer sheet, and
- transferring the overlay from said transfer sheet to said support material in non-fluid-image areas.

2. The method of claim 1 wherein the step of transferring the overlay from said transfer sheet to said support material in non-fluid-image areas includes separating the support material from said transfer sheet to effectuate said transfer.

3. The method of claim 1 wherein the step of depositing a fluid image from an original document onto a support material includes heating the original document to a temperature sufficient to volatize the original image thereon.

4. The method of claim 1 wherein the step of depositing a fluid image from an original document onto a support material includes superposing said original document and said support material under a pressure sufficient to transfer an image from the original document onto said support material.

5. The process of forming image reproductions comprising the steps of:
- forming a sandwich between first and second support sheets adhesively bonded, the first of said support sheets bearing fluid deposit in image configuration from an original image and the second of said support sheets bearing a tacky surface overlay adhesive to the first of said support sheets in nonfluid deposit areas,
- said fluid deposit in image configuration being abhesive to said overlay on said second support sheet, and
- separating said support sheets from each other whereby said overlay on said second support sheet is released to said first support sheet in the surface areas devoid of the fluid image.

6. The process of forming image reproductions comprising the steps of:

depositing a fluid from an original image in image configuration onto a first support, presenting said fluid bearing support into adhesive contact against a second support containing a transfer overlay adhesive to said support material in nonfluid image area, said fluid image being abhesive to said overlay on said second support, and separating said supports from each other whereby said transfer overlay on said second support is released to said first support in the surface areas devoid of the fluid image.

7. The process according to claim 6 in which said first support comprises an adhesive tape that is presented into contact with the transfer overlay on said second support.

8. The process according to claim 6 in which the transfer overlay on said second support comprises a metallic film.

9. The process according to claim 6 in which the transfer overlay on said second support base comprises a colloidal suspension of material in a solvent.

10. The process according to claim 6 in which the fluid deposit is the deposition in fingerprint configuration of a human finger placed thereagainst.

11. The process according to claim 6 in which said transfer overlay is opaque and at least one of said supports is transparent.

12. The process of forming image reproductions comprising the steps of:

volatilizing a portion of a graphic image on an original document to condense in image configuration onto a receptor base, presenting said volatile image bearing receptor base into adhesive contact against a support containing a surface film adhesive to said receptor base in noncondensate image areas, said condensate image being abhesive to said surface film on said support, and separating said base and said support from each other whereby said film on said support is released to said base in the surface areas devoid of the condensed image.

13. The process according to claim 12 in which said receptor base comprises an adhesive tape that is presented into contact with the film on said second support.

14. The process according to claim 12 in which said portion of the graphic image is volatilized to condense onto said receptor base by the application of heat while said receptor base is supported contiguous to the original document.

15. A process of fingerprint recording comprising the steps of:

placing a human finger of which a print is to be recorded against a receptor base to deposit a fluid release thereon in print configuration, presenting said fluid bearing receptor base into adhesive contact against a support containing a surface film adhesive to said receptor base in nonfluid release areas, said fluid release in print configuration being abhesive to said surface film on said support, and separating said base and said support from each other whereby said film from said support is released to said receptor base in the surface areas devoid of the fluid deposit.

16. The process according to claim 15 in which said receptor base comprises an adhesive tape and the finger is placed against the adhesive surface thereof.

References Cited

UNITED STATES PATENTS

| | | | |
|---|---|---|---|
| 2,139,640 | 12/1938 | Mall | 117—5.5 |
| 2,849,331 | 8/1958 | Turbolente | 117—5.5 |

FOREIGN PATENTS

| | | |
|---|---|---|
| 943,401 | 12/1963 | Great Britain. |

MURRAY KATZ, *Primary Examiner.*